June 23, 1936.  R. J. GRAY  2,045,297
GREASE GUN FILLER
Filed Aug. 4, 1932
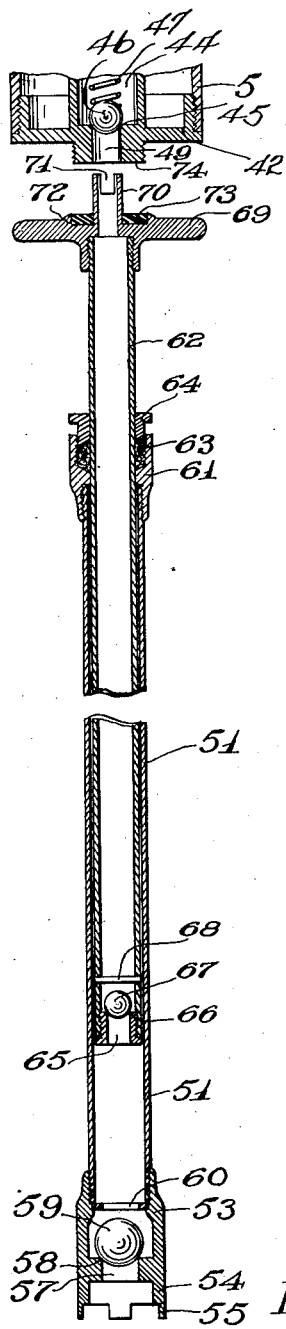
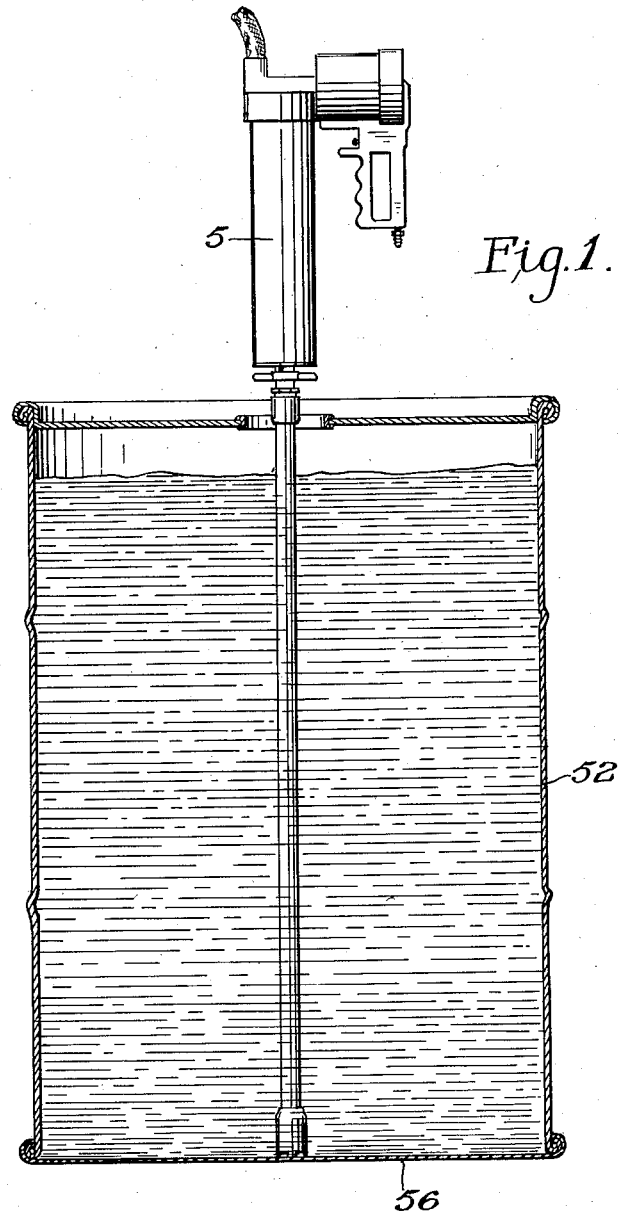
Fig.1.
Fig.2
Inventor
RUSSELL J GRAY
By Leonard L. Kalish
Attorney Patented June 23, 1936

2,045,297

UNITED STATES PATENT OFFICE 2,045,297

GREASE GUN FILLER

Russell J. Gray, Minneapolis, Minn.

Application August 4, 1932, Serial No. 627,527

1 Claim. (Cl. 221—47.5)

My invention relates to a new and useful means for filling or charging grease guns, and it relates more particularly to means for filling hand-type grease guns having a storage compartment for grease or lubricant, which is of relatively small capacity and which must be frequently refilled, and upon which some suitable pressure, such as spring pressure, is exerted.

The object of my invention is to provide means whereby grease guns of this character may be readily refilled or charged with a supply of grease, when the grease contained therein is exhausted.

With the above and other objects in view, my invention consists of novel means whereby grease may be forced through said refill valve into said cylinder from any suitable source of lubricant, such as an original container of grease.

My invention further consists of other novel features all of which will appear more fully from the following detailed description.

For the purpose of illustrating my invention, I have shown in the accompanying drawing one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawing in which like reference characters indicate like parts:

Figure 1 represents a front elevational view of the grease gun and refill pump, embodying my invention, shown in operative relation to each other.

Figure 2 represents a sectional view of the refill pump and of the refill valve of the grease gun, on an enlarged scale, showing the same in inoperative relation to each other.

According to my present invention, I provide a cylindrical grease or lubricant reservoir 5, forming part of a grease gun and preferably formed of comparatively thin tubular sheet metal, such as steel or other suitable tubing.

The reservoir 5 is provided with a terminal cap member 42 which includes a valve chamber 44, and the valve seat 45, and within said valve chamber 44, a check valve 46 is operatively disposed and urged towards said valve seat 45, by a helical compression spring 47, one end of which abuts a suitable stop (not shown) within chamber 44.

The valve chamber 44 opens into the intake port 49, through which the lubricant is fed into said valve chamber, under pressure, past the check valve 46 and into that part of the cylindrical reservoir 5 ahead of the feeding piston, not shown.

In Figure 2, I have illustrated the refill pump employed for filling grease into the cylindrical reservoir 5. The refill pump includes the outer tubular cylinder 51, of a suitable length from which the lubricant is to be filled into the reservoir 5 of a grease gun. To the lower end of the cylinder 51, the intake valve housing 53 is threadedly secured. The valve housing 51 includes a lower skirt-like projection 54 including a suitable number of individual projections 55, which are adapted to rest against the bottom 56 of the container or drum 52, thereby to form an abutment against which the pump may be operated, without closing off the intake port 57 of the pump. The inwardly facing valve seat 58 is provided within the valve housing 53, and a check valve 59 cooperates with said valve seat 58, under the action of gravity, thereby to permit the passage of grease into the valve housing chamber 53, and to close the same against the egress of grease. An annular washer 60 serves to limit the upward movement of the valve 59.

To the upper end of the cylinder 51, the stuffing gland 61 is threadedly secured. Through the stuffing gland 61, the tubular piston rod or plunger 62 is extended, surrounded by suitable packing material 63, and the screw-threaded collar 64, whereby said packing material 63 may be kept tight against the outer wall of the tubular plunger 62, thereby to form a pressure-proof seal around the same.

To the lower end of the tubular piston or plunger 62, the tubular bushing 65 is threadedly secured;—said bushing 65 having the inwardly facing valve seat 66, with which the check valve 67 is adapted to cooperate under the action of gravity. A transverse pin 68 extended across the tubular member 62 serves to confine the check valve 67 in proximity to the valve seat 66.

To the upper end of the tubular piston rod or plunger 62, the handle member 69 is threadedly secured. The handle member 69 includes the nozzle 70 having a slot 71 extended across the free end thereof, and said handle member 69 also includes an annular recess 72, in which an annular packing gasket or washer 73, of leather or other suitable material, is disposed. The nozzle 70 is of an outside diameter, such as will pass neatly into the intake port 49 of the refill valve of the grease gun (Figure 2), and the length of the nozzle 70 is such that when the outer shoulder 74 of the refill valve housing abuts the sealing gasket 73, the slotted end of the nozzle 70 will have raised the valve 46 from its valve seat 45, thereby to permit the free flow of grease past said check valve 46 into the tube 38 and into the cylindrical grease reservoir 5 of the grease gun ahead of the piston therein.

In order to fill the reservoir 5 of the grease gun, the screw cap 75 is unscrewed from the outer end of the valve housing, and the handle 69 and plunger 62 are raised upwardly with respect to the cylinder 51. Then the grease gun is superimposed upon the nozzle 70, in the manner illustrated and with the cylindrical barrel 5 of the grease gun gripped firmly in both hands, the shoulder 74 is pressed against the sealing gasket 73, and with the force of this pressure, the tubular plunger 63 is forced down into the cylinder 51. This causes the grease to be expelled through the nozzle 70 into the grease gun.

To repeat the operation, the plunger 62 is again raised.

By this means, it becomes unnecessary to dismantle the grease gun in order to refill it or charge it with grease. When the grease gun has been charged, screw cap is placed upon the end of the refill valve, so as to exclude dirt or foreign matter.

I am aware that my invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention, what I hereby claim as new and desire to secure by Letters Patent, is:

A refill pump adapted to be temporarily inserted into an original container of lubricant with its lower end in abutting and cooperative relation with the bottom of said container, comprising a tubular cylinder, having an intake check valve at its lower end, a tubular plunger of generally the same length as the cylinder, slidably mounted within said cylinder, said tubular plunger having an intake valve carried at its lower end, and a nozzle at its upper end having a side opening near the end thereof, a handle member near the upper end of said tubular plunger for raising the same, and means intermediate said cylinder and said plunger for maintaining a pressure-proof seal therebetween.

RUSSELL J. GRAY.